(12) United States Patent
Nacy et al.

(10) Patent No.: US 11,396,252 B2
(45) Date of Patent: Jul. 26, 2022

(54) CABLE DRIVEN HEAD RESTRAINT FOR A REVERSIBLE SEAT

(71) Applicants: Magna Seating Inc, Aurora (CA); Michael D Nacy, Lake Orion, MI (US); Cheikh Dioum, Farmington Hills, MI (US); Louis Vetere, II, Commerce Township, MI (US); Detjon Marini, White Lake, MI (US); Kai Zhao, Rochester Hills, MI (US)

(72) Inventors: Michael D Nacy, Lake Orion, MI (US); Cheikh Dioum, Farmington Hills, MI (US); Louis Vetere, II, Commerce Township, MI (US); Detjon Marini, White Lake, MI (US); Kai Zhao, Rochester Hills, MI (US)

(73) Assignee: Magna Seating Inc, Aurora (CA)

( * ) Notice: Subject to any disclaimer, the term of this patent is extended or adjusted under 35 U.S.C. 154(b) by 0 days.

(21) Appl. No.: 17/040,599

(22) PCT Filed: Mar. 25, 2019

(86) PCT No.: PCT/US2019/023833
§ 371 (c)(1),
(2) Date: Sep. 23, 2020

(87) PCT Pub. No.: WO2019/183619
PCT Pub. Date: Sep. 26, 2019

(65) Prior Publication Data
US 2021/0053475 A1 Feb. 25, 2021

Related U.S. Application Data

(60) Provisional application No. 62/646,953, filed on Mar. 23, 2018.

(51) Int. Cl.
*B60N 2/80* (2018.01)
*B60N 2/862* (2018.01)
(Continued)

(52) U.S. Cl.
CPC .......... *B60N 2/862* (2018.02); *B60N 2/0292* (2013.01); *B60N 2/10* (2013.01); *B60N 2/20* (2013.01); *B60N 2/853* (2018.02); *F16C 1/10* (2013.01)

(58) Field of Classification Search
CPC ........ B60N 2/862; B60N 2/838; B60N 2/853; B60N 2/203; B60N 2/0292; B60N 2/10; B60N 2/20; B60N 2/02; F16C 1/10
(Continued)

(56) References Cited

U.S. PATENT DOCUMENTS 3,877,746 A * 4/1975 Christine ............... B60N 2/203
297/95
6,962,392 B2 * 11/2005 O'Connor ............... A47C 7/38
297/61
(Continued)

FOREIGN PATENT DOCUMENTS

DE 102005041736 3/2007
DE 102006038574 2/2008
(Continued)

*Primary Examiner* — Mark R Wendell
(74) *Attorney, Agent, or Firm* — Miller Canfield

(57) ABSTRACT

An improved head restraint is provided for a reversible seat that is movable between two use positions, namely a forward-facing position and a rearward-facing position. The improved head restraint automatically pivots to a fold flat position upon unlocking of the seat, wherein the head restraint is positioned in this fold flat position during reversing seat movement, so as to reduce the seat height and clear the vehicle headliner. The head restraint is cable driven and operably connected to the seat linkages that control movement of the seat cushion and seat back during reversing (Continued)

movement. As such, the seat movement articulates the head restraint so that the head restraint angles forwardly toward the occupant in the forward-facing position and rearwardly toward the occupant in the rearward-facing position, while permitting the head restraint to automatically articulate to the fold flat position during travel of the seat between these two use positions.

20 Claims, 16 Drawing Sheets

(51) Int. Cl.
| | |
|---|---|
| *B60N 2/853* | (2018.01) |
| *B60N 2/02* | (2006.01) |
| *B60N 2/10* | (2006.01) |
| *B60N 2/20* | (2006.01) |
| *F16C 1/10* | (2006.01) |

(58) Field of Classification Search
USPC .......................................................... 297/94
See application file for complete search history.

(56) References Cited

U.S. PATENT DOCUMENTS

| | | | | |
|---|---|---|---|---|
| 9,145,078 | B2* | 9/2015 | Locke | B60N 2/832 |
| 10,843,606 | B2* | 11/2020 | Vetere, II | B60N 2/844 |
| 2005/0253433 | A1* | 11/2005 | Brown | B60N 2/203 |
| | | | | 297/283.3 |
| 2005/0253443 | A1 | 11/2005 | Brown et al. | |
| 2007/0126270 | A1* | 6/2007 | Saint-Jalmes | B60N 2/0224 |
| | | | | 297/283.3 |
| 2019/0283640 | A1* | 9/2019 | Vetere, II | B60N 2/767 |
| 2020/0223326 | A1* | 7/2020 | Tanaka | B60N 2/005 |

FOREIGN PATENT DOCUMENTS

| | | |
|---|---|---|
| WO | 0196140 | 12/2001 |
| WO | 2007056850 | 5/2007 |

* cited by examiner

CABLE DRIVEN HEAD RESTRAINT FOR A REVERSIBLE SEAT

CROSS-REFERENCE TO RELATED APPLICATIONS

This application claims priority to U.S. provisional patent application No. 62/646,953, filed Mar. 23, 2018, the disclosure of which is incorporated herein by reference.

FIELD OF THE INVENTION

The invention relates to a reversible seat with a head restraint, and more particularly to a reversible seat for a vehicle having a cable driven head restraint which automatically articulates to a fold flat position during reversing movement of the seat between forward-facing and rearward-facing positions.

BACKGROUND OF THE INVENTION

It is known in the art to provide reversible seats or seat assemblies for use in various vehicles such as automobiles. For example, U.S. Pat. Nos. 7,644,982 B2 and 6,715,825 B2, which are incorporated herein by reference, each disclose a seat assembly that allows a user to position the seat cushion and seat back between two seat positions, namely a forward-facing position and a rearward-facing position. Each known seat assembly includes seat control linkages for positioning the seat back between the forward-facing and rearward-facing positions wherein the angle of the seat cushion changes inclination during movement of the seatback between these two facing positions. It also is known to include a headrest on the seat which can articulate or pivot between forward and rearward positions for use by the occupant.

It is an object of the invention to provide a reversible seat which includes a head restraint that articulates with the seat back and automatically pivots to a fold flat position as the seat back moves through a neutral, upright position in between the forward-facing and rearward-facing positions.

SUMMARY OF THE INVENTION

More particularly, the invention relates to an improved head restraint for a reversible seat or seat assembly wherein the seat is movable between two seat positions, so that an occupant can sit and face in either direction. As such, the seat is reversible from the forward-facing position to the rearward-facing position, or vice versa, wherein the improved head restraint automatically pivots to a fold flat position during this reversing movement of the seat between these two seat positions. When in this fold flat position, the head restraint is lowered, so as to reduce the seat height to better clear or avoid interference with the vehicle headliner during seat movement.

In more detail, the head restraint is cable driven and operably connected to seat linkages that control movement of the seat cushion and seat back during reversing movement thereof. An articulating mechanism is provided which includes a cable linkage between the head restraint and the seat linkages to automatically articulate the head restraint between first and second use positions. In these positions, the head restraint angles forwardly toward the occupant in the first use position when the seat is in the forward-facing position and rearwardly toward the occupant in the second use position when the seat is in the rearward-facing position.

The interconnection of the seat linkages with the cable linkage governs and controls movement of the head restraint between these first and second use positions, while permitting the head restraint to automatically articulate to the fold flat condition during travel of the seat.

The seat linkages also include a seat lock mechanism to releasably lock the seat in the forward-facing and rearward facing positions. The seat lock mechanism includes a release handle or actuator accessible from the seat, which can be manually actuated to release the lock mechanism and permit reversing movement of the seat between the two seat positions.

The head restraint also includes a secondary lock mechanism to lock the head restraint in either of the first and second use positions depending upon the direction in which the seat faces. The secondary lock mechanism preferably connects to the release handle of the seat lock mechanism so that the release handle can simultaneously unlock the seat and unlock the head restraint. Once unlocked, the head restraint can automatically rotate to the fold flat position.

To release the head restraint from either of the first and second use positions and allow the head restraint to automatically articulate to the fold flat position, the release handle or actuator of the seat lock mechanism is operatively connected to the secondary lock mechanism such that pulling on the release handle releases both the seat lock mechanism and the head restraint. Once released, the seat is movable and the head restraint preferably articulates automatically to the fold flat position to avoid interference with the headliner as the seat position is reversed. As the seat moves, the cable linkage of the articulating mechanism is operated by the seat movement and articulates the angle of the head restraint.

With this configuration, an improved head restraint is provided which allows the head restraint to avoid headliner interference, and automatically articulate between first and second use positions as the seat is moved.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein.

Figure 1:
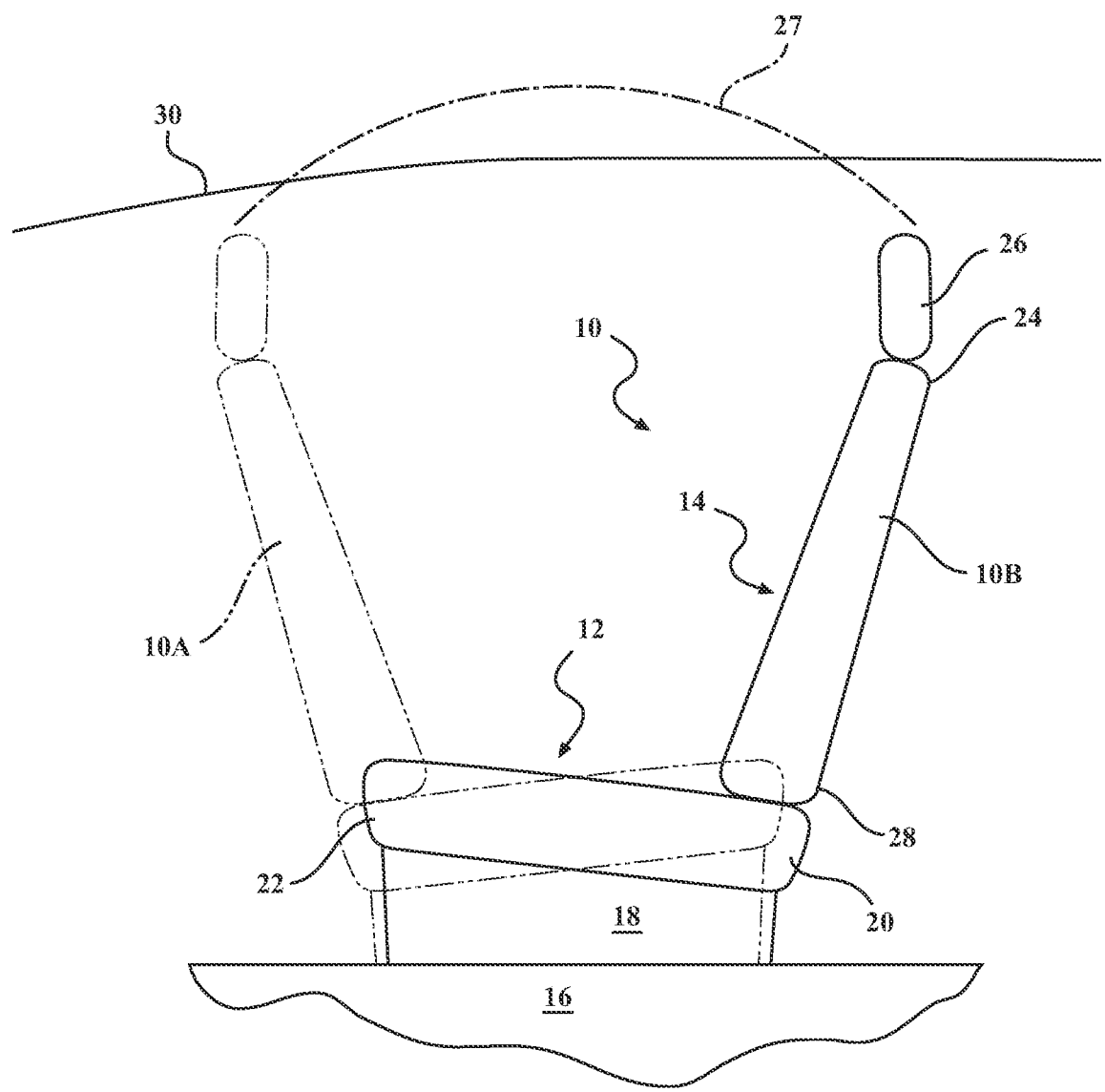
FIG. 1 is a side view of a reversible seat assembly according to one embodiment of the invention illustrating a forward-facing seating position in hidden lines and a rearward-facing seating position in solid lines.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION OF THE PREFERRED EMBODIMENTS

FIG. 1 illustrates a reversible seat assembly 10 for use in an automotive vehicle, wherein the seat assembly is shown in multiple operative design positions. This reversible seat assembly 10 is reversibly movable both forwardly and rearwardly to change the direction in which an occupant faces.

Generally, the seat assembly 10 includes a seat cushion 12 and a seat back 14 operatively coupled together for supporting the occupant in a generally upright seating position. The seat cushion 12 is supported above a floor in the vehicle and operatively connected to the seat back 14 by a seat riser assembly 18. The seat back 14 is pivotally coupled to the seat riser assembly 18 so as to pivot or rotate in forward and rearward directions. Also, the seat cushion 12 is supported by the seat riser assembly 18 so as to displace forwardly and rearwardly as is generally shown in FIG. 1, wherein such movement also changes the orientation or inclination of the seat cushion 12 as the seat assembly 10 moves between a forward-facing position 10A and a rearward-facing position 10B.

The seat cushion 12 includes a front end 20 and an opposite rear end 22. The seat back 14 includes an upper end 24 for supporting a head restraint 26 and an opposite lower end 28 positioned adjacent the seat cushion 12. FIG. 1 discloses the seat assembly 10 in a plurality of seating positions. First, the seat assembly 10 is illustrated in hidden lines in the forward-facing seating position at 10A. Forward-facing is defined as the seat cushion 12 and seat back 14 positioned to support the seat occupant in a direction facing toward the front of the vehicle, as is commonly known. With the seat assembly 10 in the forward-facing seating position 10A, the seat cushion 12 is in a first inclined position such that the front end 20 is spaced farther from the vehicle floor 16 than the rear end 22. Additionally, the seat back 14 is in a first generally upright position with the lower end 28 immediately adjacent the rear end 22 of the seat cushion 12. Second, the seat assembly 10 is illustrated in solid lines in a rearward-facing seating position at 10B. Rearward-facing is defined as the seat cushion 12 and seat back 14 positioned to support the seat occupant in a direction facing toward the rear of the vehicle. With the seat assembly 10 in the rearward-facing seating position 10B, the seat cushion 12 is in a second inclined position such that the rear end 22 is spaced farther from the vehicle floor 16 than the front end 20. Additionally, the seat back 14 is in a second generally upright position, however, the lower end 28 is now immediately adjacent the front end 20 of the seat cushion 12.

In a typical configuration, a vehicle typically includes a ceiling or covering surface more commonly referenced as a headliner 30. If the head restraint 26 remains upright during seat movement, a problem can occur if an upper surface of the head restraint 26 interferes with the headliner 30. To illustrate this potential problem, reference line 27 shows the travel arc interfering with the headliner 30. To avoid this problem, it can be undesirable to raise the headliner 30 or lower or shorten the seat 10. Therefore, the present invention relates to an improved head restraint 26 which is able to articulate or fold downwardly as generally shown in FIG. 2 so that the head restraint 26 avoids interference with the headliner 30 while still maintaining the overall height of the seat 10.

Figure 2:
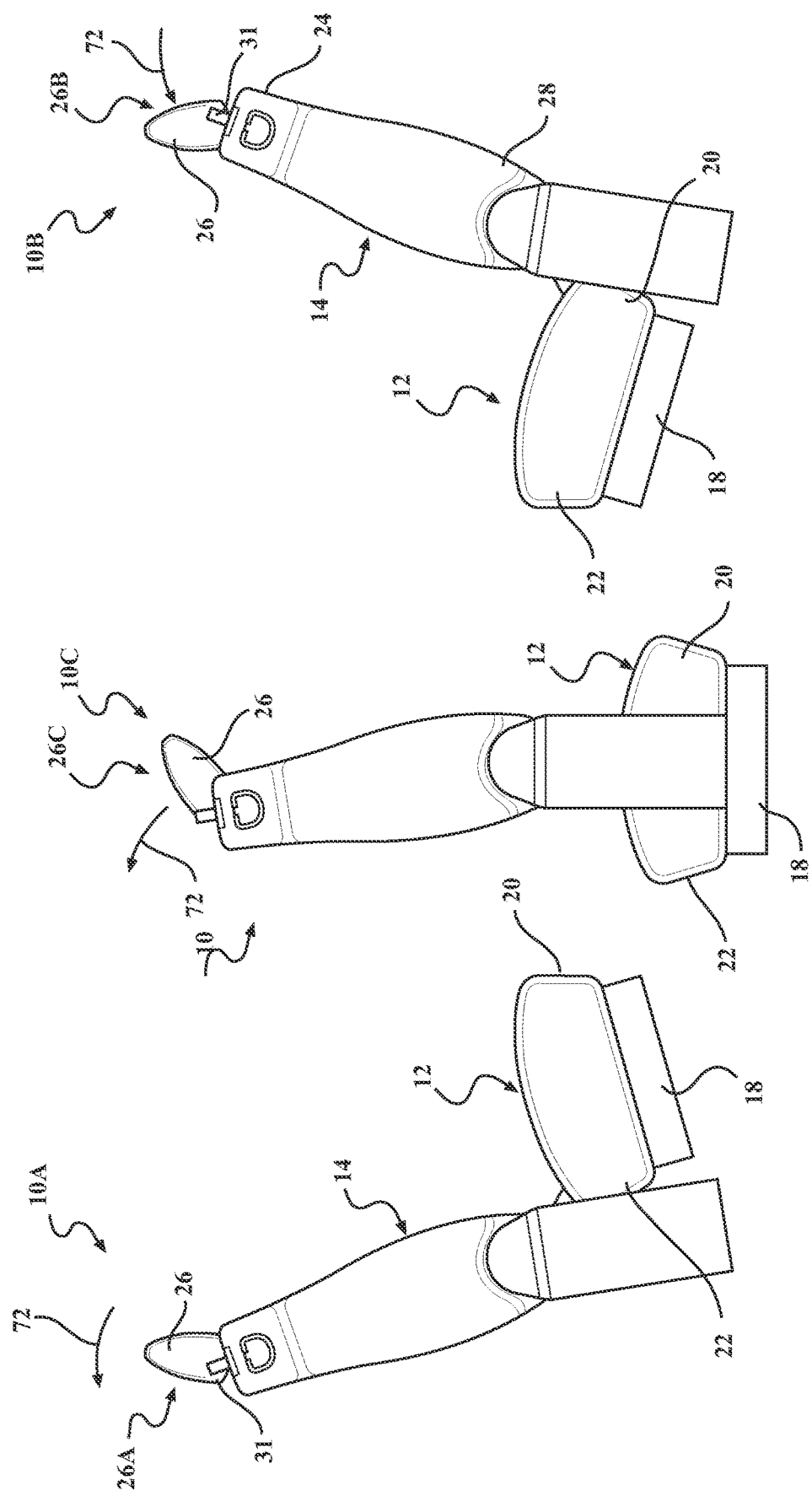
FIG. 2 is a diagrammatic side view illustrating a reversible seat moving between the forward-facing and rearward-facing positions with a head restraint inclined at an angle in corresponding first and second use positions and an intermediate fold flat position during seat movement.

Referring to FIG. 2, as the seat assembly 10 moves forwardly and rearwardly between the forward-facing position 10A and rearward-facing position 10B, the seat assembly 10 travels through a neutral, intermediate position 10C shown in the center of FIG. 2. As previously described relative to FIG. 1, the seat back 14 pivots while the seat cushion 12 articulates during this seat movement.

It should be understood that the terms forward and rearward as used herein are used to differentiate the orientation of the seat assembly 10 as it moves through its range of travel and the direction in which the seat typically faces relative to the front and rear of a vehicle. However, it will be understood that such terms could simply refer to first and second directions and this terminology is not intended to restrict the invention to the orientation of the seat assembly 10 when mounted in the vehicle. Typically, the seat assembly 10 may be provided in any vehicle but is particularly useful in multi-occupant vehicles to allow changing of the seating configuration.

More particularly, the invention relates to an improved head restraint 26 which avoids headliner interference. When the seat 10 is in the forward-facing position 10A and the rearward-facing position 10B, the head restraint 26 is oriented generally upright in first and second use positions 26A and 26B respectively. Preferably, the head restraint 26 is inclined forwardly or rearwardly at an angle relative to the seat back 14 when in these use positions 26A and 26B to provide ergonomic support to the occupant.

Further, the improved head restraint 26 automatically pivots to a fold flat position 26C during reversing movement of the seat 10. When in this fold flat position 26C, the head restraint is lowered, so as to reduce the seat height and better clear or avoid interference with the vehicle headliner 30 (FIG. 1).

As will be described in more detail herein, the head restraint 26 is cable driven and operably connected to seat linkages that control movement of the seat cushion 12 and seat back 14. A cable linkage described below extends between the head restraint 26 and seat linkages in the seat riser assembly 18 to automatically articulate the head restraint 26 between the first and second use positions 26A and 26B. The interconnection of the seat linkages and the cable linkage governs and controls movement of the head restraint 26 between these first and second use positions 26A and 26B, while permitting the head restraint to automatically articulate to the fold flat position 26C during travel of the seat cushion 12 and back rest 14.

Further, the seat 10 and head restraint 26 are lockable in use. In these forward-facing and rearward-facings positions, both the seat 10 and head restraint 26 are locked to support the weight of the occupant during vehicle travel. However, the seat 10 can be readily reconfigured when unlocked. Preferably the seat 10 and head restraint 26 are unlocked together by a common release handle or actuator 31 accessible from the seat back 14, which can be manually actuated to permit unlocking and reversing movement of the seat 10 and unlocking of the head restraint 26. Once the head restraint 26 is unlocked, it automatically folds or pivots to the fold flat position 26C during seat movement. As such, the head restraint 26 and seat cushion 12 are operatively connected together so that this displacement or movement of the seat cushion 12 into either of the forward-facing or rearward-facing positions 10A and 10B causes a corresponding articulation of the head restraint 26 to the respective forward or rearward use positions 26A and 26B, at which time the seat 10 and head restraint 26 can again be locked in position for use.

Figure 3:
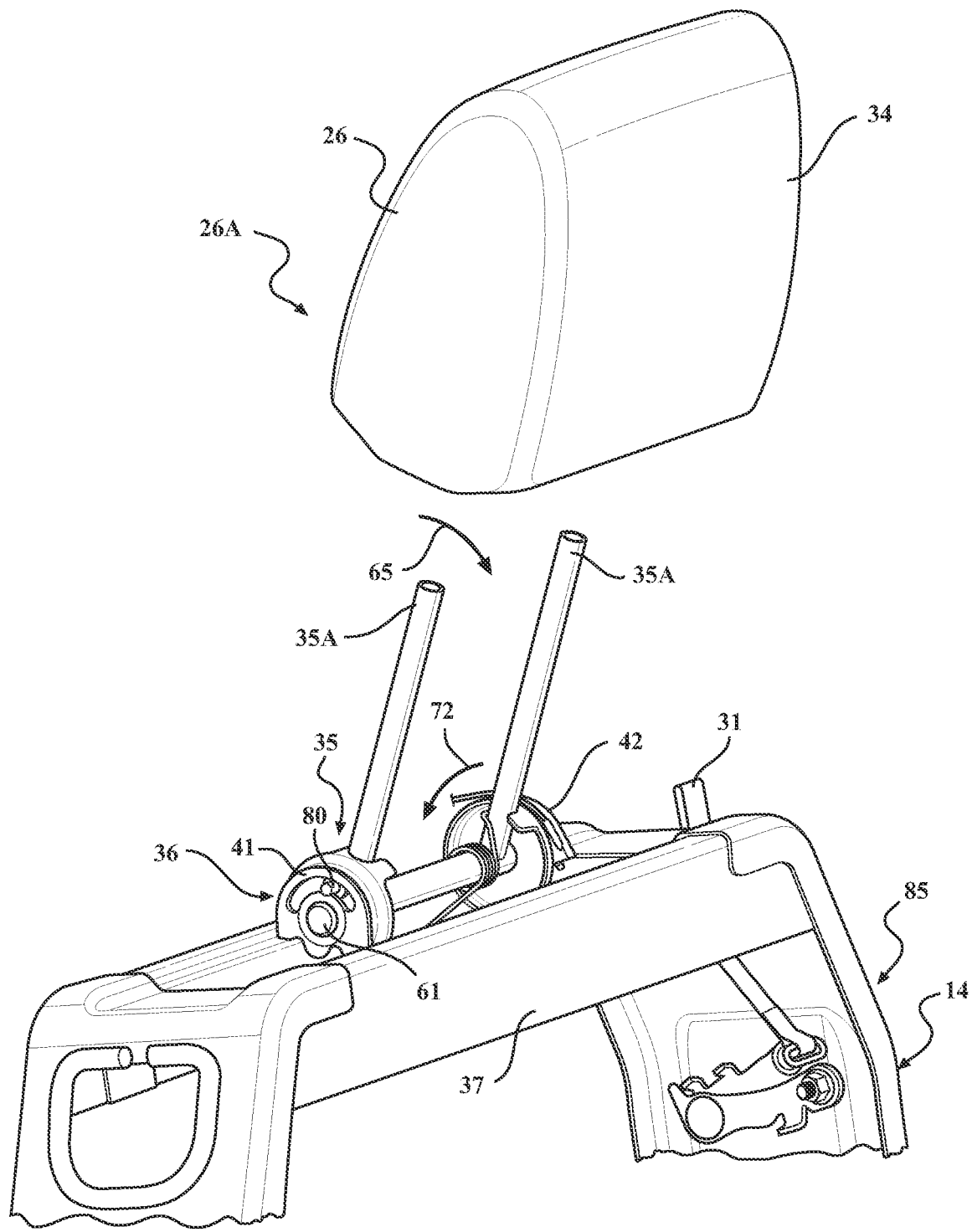
FIG. 3 is a partially exploded side perspective view of the assembly of the head restraint mounted to the seat back as taken from a first side of the seat.
Figure 4:
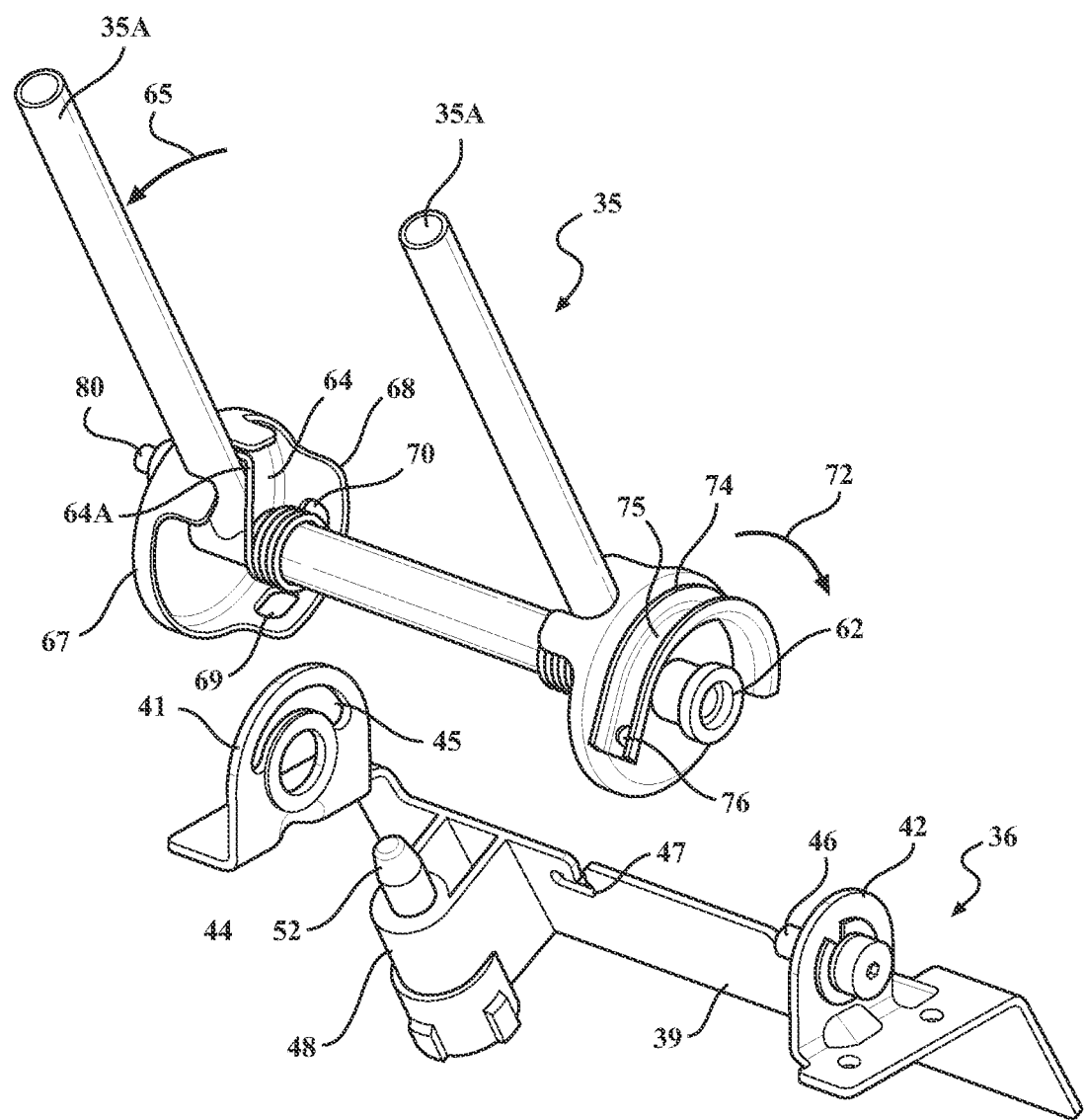
FIG. 4 is a partially exploded perspective view of a post frame and support frame.

Next, as to FIGS. 3 and 4, the head restraint 26 is formed as an assembly of articulating components comprising a cushion 34 and a generally U-shaped post frame 35 pivotally coupled to a stationary support frame 36. The post frame 35 includes tubular head restraint posts 35A on which the cushion 34 is mounted. The support frame 36 is mounted on the upper cross member 37 of the seat back frame 85, such that the post frame 35 and head restraint cushion 34 can be pivotably supported on the seat back 14.

The support frame 36 comprises a mounting flange 39, which may be fastened to the upper cross member 37, and first and second pivot mounts 41 and 42, which project upwardly and pivotally support the post frame 35. The first pivot mount 41 is formed as an upstanding plate having a central pivot bore 44 and a guide slot 45. The second pivot mount 42 includes a pivot shaft 46. To spring-bias the post frame 35 to the fold flat position 26C, the support frame 36 also includes a main body having one or more spring seats 47 (FIGS. 4 and 6) as will be described further herein.

To lock the head restraint 26 in position (FIGS. 5 and 6), the support frame 36 includes a locking pin mount 48 located near the first pivot mount 41. To control articulation of the head restraint 26, the support frame 36 also includes a cable mount 49 near the second pivot mount 42.

For locking of the head restraint 26, a lock mechanism 51 is provided which comprises a plunger-like locking pin 52 which is displaceable by a lock release cable 53. The locking pin 52 is spring loaded and supported within the locking pin mount 48 so as to project outwardly therefrom for releasable engagement with the post frame 35. The locking pin 52 is normally biased outwardly, but may be pulled back into the locking pin mount 48 by actuation of the lock release cable 53. Further disclosure as to actuation of the lock release cable 53 will be provided below.

To control articulation of the head restraint 26 between the first and second use positions 26A and 26B, an articulating mechanism 55 is provided which includes an articulation cable 56 connected as a cable linkage to the cable mount 49. The cable 56 includes a displaceable inner cable 57, which is slidable within an outer sheath or housing 58 and terminates at a cable head 59. As described below, the cable head 59 connects to and articulates the post frame 35 and the cable 56 is automatically actuated by movement of the seat cushion 12.

Figure 5:
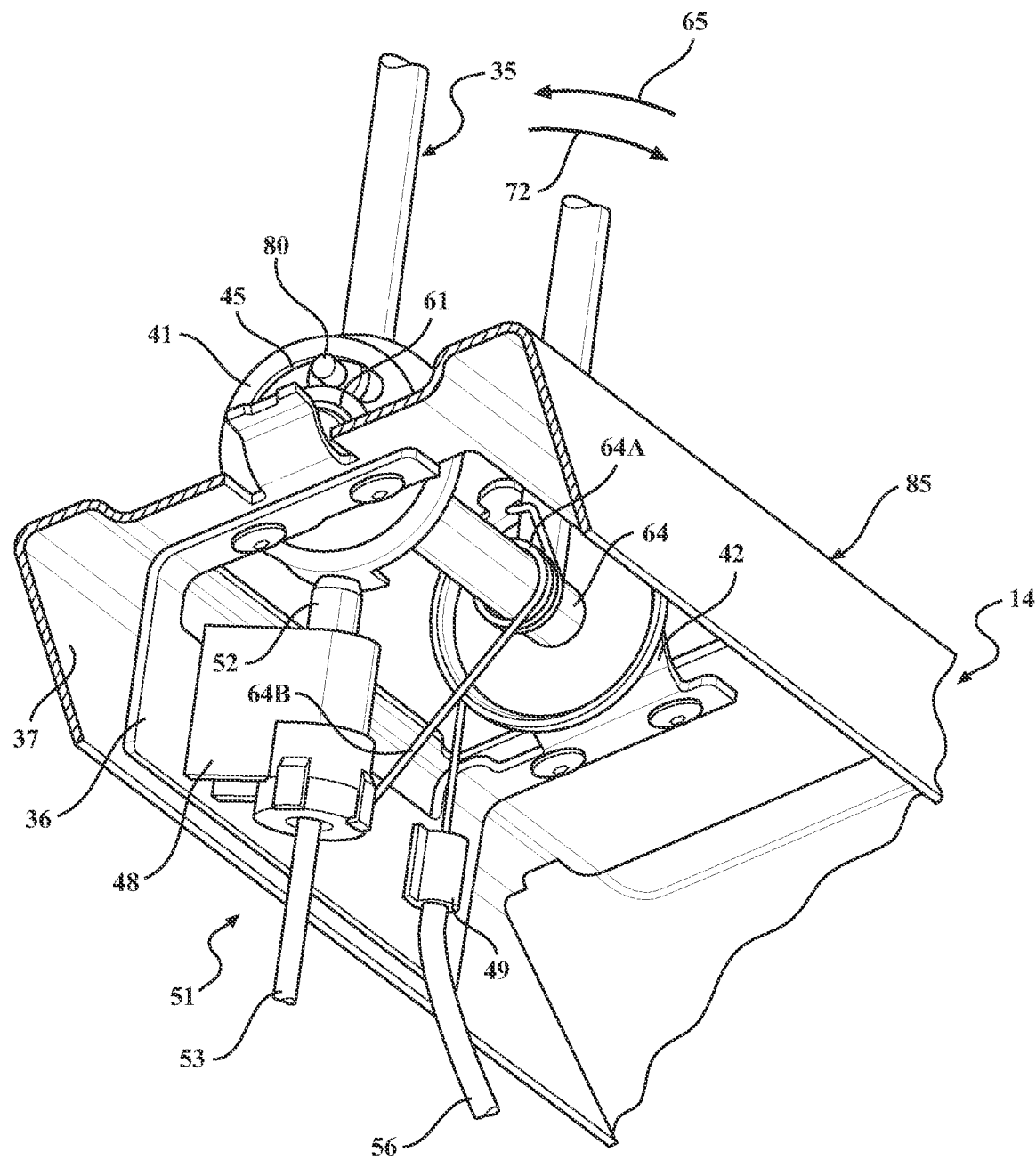
FIG. 5 is a cut away perspective view of the head restraint mounted to the seat back as taken from the first side.
Figure 6:
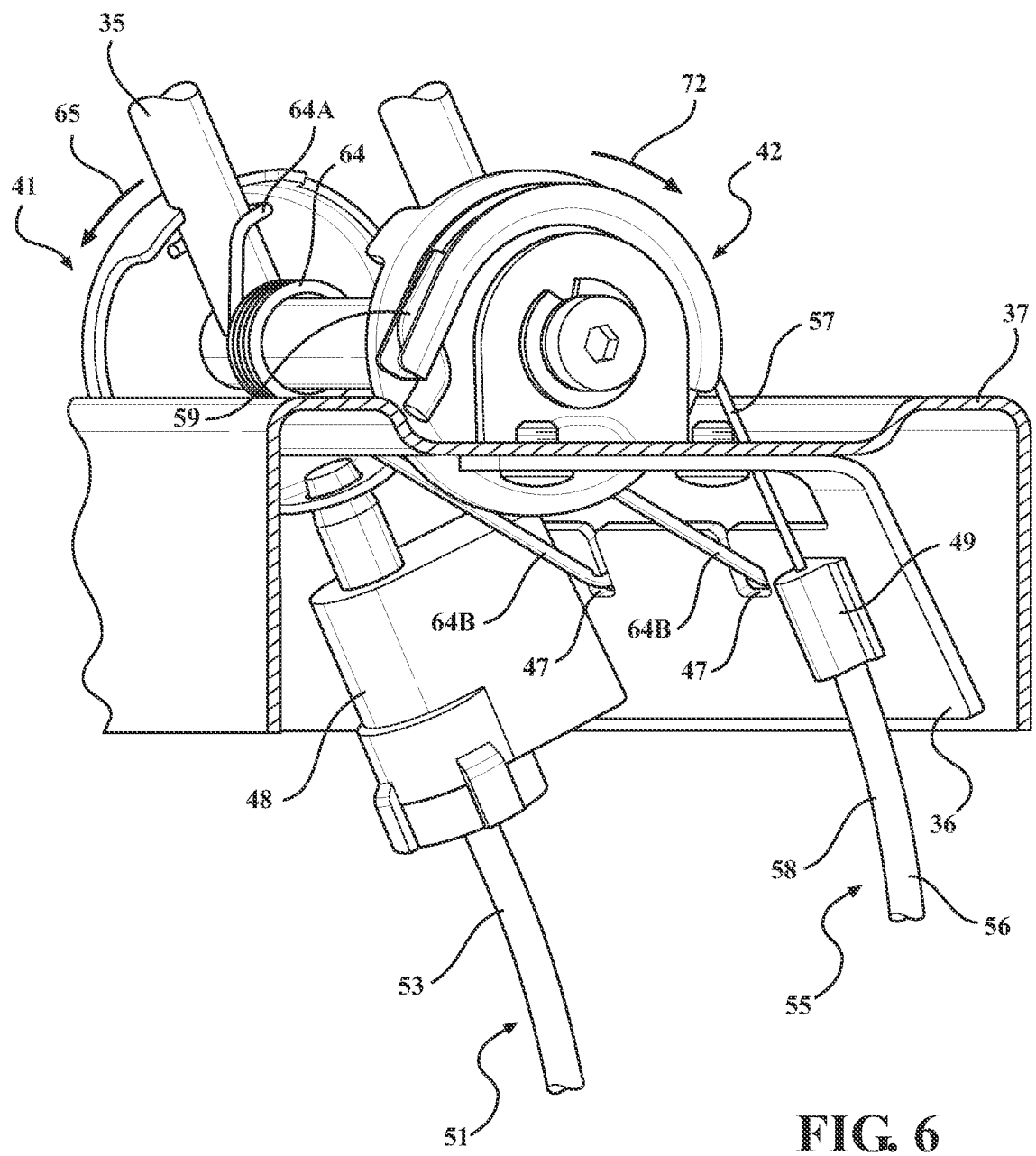
FIG. 6 is a cut away perspective view of the head restraint from a second side.

As to the post frame 35 seen in FIGS. 3-6, the post frame 35 further includes first and second pivot shafts 61 and 62 at the opposite ends of a cross tube 63. The support posts 35A are fixed to and extend radially from the cross tube 63, wherein the first and second pivot shafts 61 and 62 rotatably engage with the pivot bore 44 and pivot shaft 46 so that the post frame 35 is pivotally mounted to the support frame 36. As best seen in FIGS. 5 and 6, the post frame 35 includes a pair of springs 64 or other types of biasing members which have upper spring legs 64A which engage the posts 35A and lower spring legs 64B which fixedly engage the spring seats 47 of the support frame 36. The springs 64 are placed in compression so as to normally bias the post frame 35 in the direction 65 which generally corresponds to the fold flat position 26C of the head restraint 26. In the absence of other forces acting counter to the biasing force of the springs 64, the head restraint 26 would automatically fold or pivot in direction 65 to the fold flat position 26C.

To effect locking of the head restraint 26 as described above, the cross tube 63 also includes a locking plate 67 (FIG. 4) having an arcuate lock flange 68 formed with a first lock bore or seat 69 and a second lock bore or seat 70. The lock bores 69 and 70 are circumferentially spaced apart about the rotation axis of the cross tube 63 to define two different rotational lock positions for the post frame 35, which thereby define the two use positions 26A and 26B of the head restraint 26. The above-described locking pin 52 is releasably engageable with the lock bores 69 and 70 to thereby lock the head restraint 26 in either of the first and second use positions 26A and 26B.

As noted above, the post frame 35 is normally spring biased in direction 65. However, the post frame 35 may be articulated by the articulating mechanism 55 in the opposite rotation direction 72, wherein the head restraint 26 is movable away from the fold flat position 26C toward the two use positions 26A and 26B. To articulate the post frame 35 during seat movement, the post frame 35 also includes a disc-like cable guide 74 having a slot 75 which receives the inner cable 57 of the articulation cable 56, and an anchor hole 76 which engages with the cable head 59. Actuation of the cable 56 thereby pulls the inner cable 57 along the slot 75 and causes rotation of the post frame 35 and head rest 26 in rotation direction 72 opposite the spring direction 65.

With this configuration, as the articulating mechanism 55 rotates the post frame 35 in the articulation direction 72, the locking pin 52 will first align with and automatically engage with the first lock bore 69 when the seat back latch or lock is closed, which thereby holds the head restraint 26 at a forward angle corresponding to the first use position 26A (see FIGS. 2, 3 and 6). This engagement of the locking pin 52 with the lock bore 69 automatically occurs as the seat 10 reaches the forward-facing position 10A. Prior to that, as the seat 10 moves across the neutral position 10C from the rearward-facing position 10B, the seat back latch may be open which preferably holds the locking pin 52 disengaged from the lock flange 68. As noted above, the locking pin 52 also is releasable from the lock bore 69 by operation of the release handle 31.

The locking pin 52 engages with this first bore 69 first since the articulating mechanism 55 and articulation cable 56 only rotates the post frame 35 through a first distance or stroke when the seat 10 moves forwardly. In particular, the head rest 26 rotates a first distance from the fold flat position 26C to the first use position 26A, but rotates a larger second distance in order to reach the second use position 26B from fold flat position 26C.

As such, during the opposite seat movement from the neutral position 10C to the rearward-facing position 10B, the articulating mechanism 55 articulates or rotates the post frame 35 from the fold flat position 26C, past position 26A, to the position 26B until the locking pin 52 aligns with the second lock bore 70. This articulation of the head restraint 26 thereby drives the head restraint 26 over the center of the seat back 14 to the rearwardly-angled position 26B as seen in FIG. 2. In this position, the locking pin 52 engages the second lock bore 70. But here again, the locking pin 52 is releasable by the release handle 31, wherein the locking pin 52 is disengaged or held open whenever the release handle 31 and seat back 14 is unlatched and then remains in disengaged as the seat 10 passes through the neutral position 10C.

To define the range of travel of the head restraint 26, the above described slot 45 is provided in the pivot mount 41 of the support frame 36. The post frame 35 includes a corresponding stop pin 80 which engages with the slot 45 (FIG. 5) and travels circumferentially along the slot 45 during rotation of the post frame 35. Essentially, at least one end of the slot 45 defines a pivot stop corresponding to the fold flat position 26C to hold the head restraint 26 in position when the stop pin 80 is biased against the slot end by the springs 64.

Figure 7:
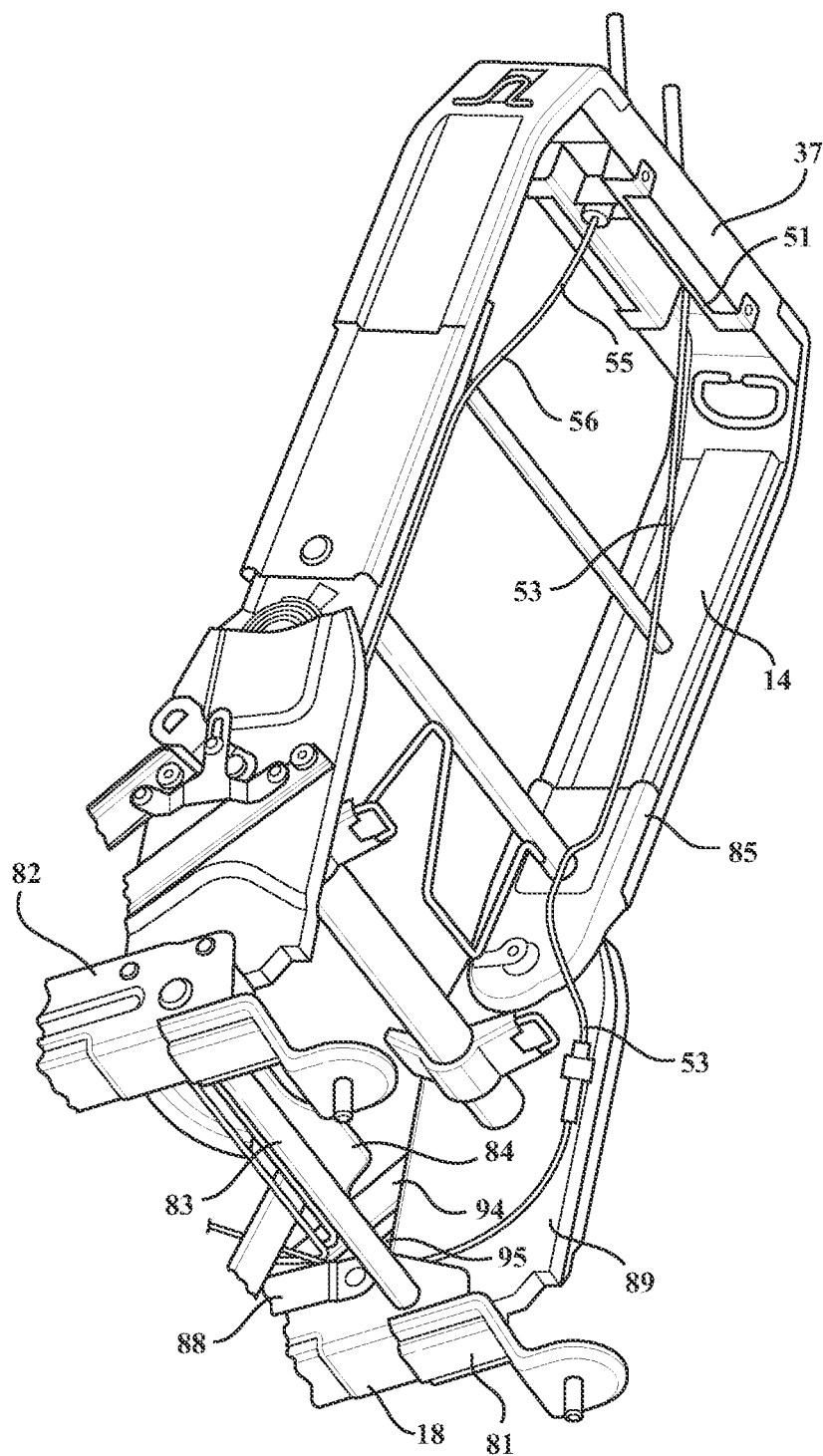
FIG. 7 is a partial perspective view of the seat back frame.
Figure 8:
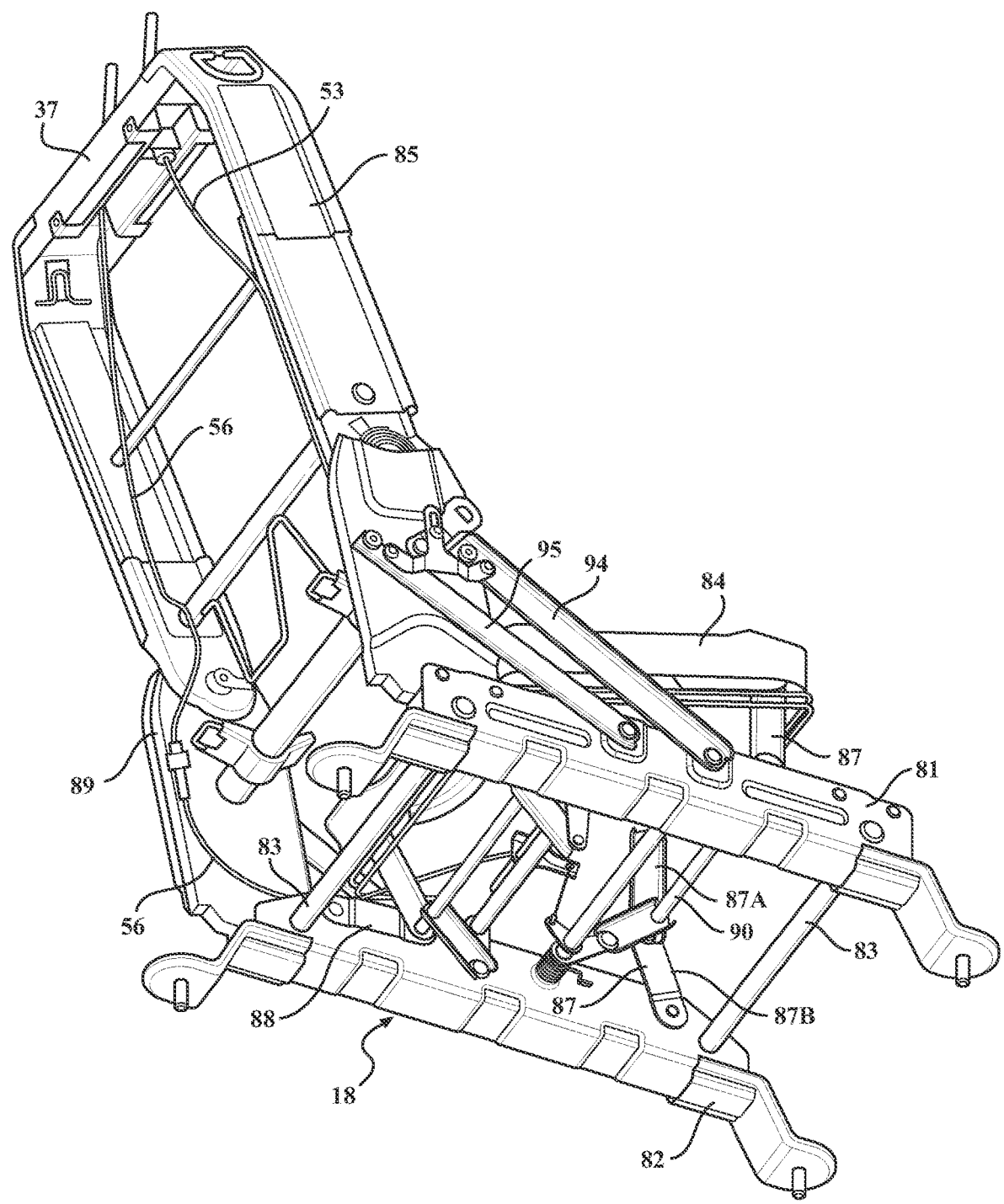
FIG. 8 is a bottom perspective view of the seat frame.

The following provides a more detailed discussion as to operation of the lock release mechanism 51 and articulating mechanism 55, which extend downwardly to the seat cushion 12 and are operated in this region. FIGS. 7 and 8 illustrate the frame construction of the reversing seat 10.

The seat 10 includes the seat riser assembly 18 for fixedly securing the seat assembly 10 to the vehicle floor 16. The seat riser assembly 18 comprises inboard 81 and outboard 82 seat risers in parallel, spaced apart relation which are interconnected by cross bars 83 extending laterally therebetween. The seat cushion 12 includes a generally rectangular seat cushion frame 84 disposed therein. The seat back 14 similarly includes a generally U-shaped seat back frame 85 disposed therein. The seat cushion frame 84 and the seat back frame 85 are each operatively coupled to the seat riser assembly 18, as will be further described below.

The seat cushion frame 84 is supported on the seat riser assembly 18 by front control linkages 87 and rear control linkages 88. These control linkages 87 and 88 control articulation of the seat cushion 12 as it moves from the forward and rearward positions described above. As such, the seat cushion frame 84 changes its inclination as it moves forwardly and rearwardly as governed by the control linkages 87 and 88. The seat cushion frame 84 is lockable in either the forward or rearward position by a seat lock mechanism 89 controlled by the release handle 31.

Figure 9:
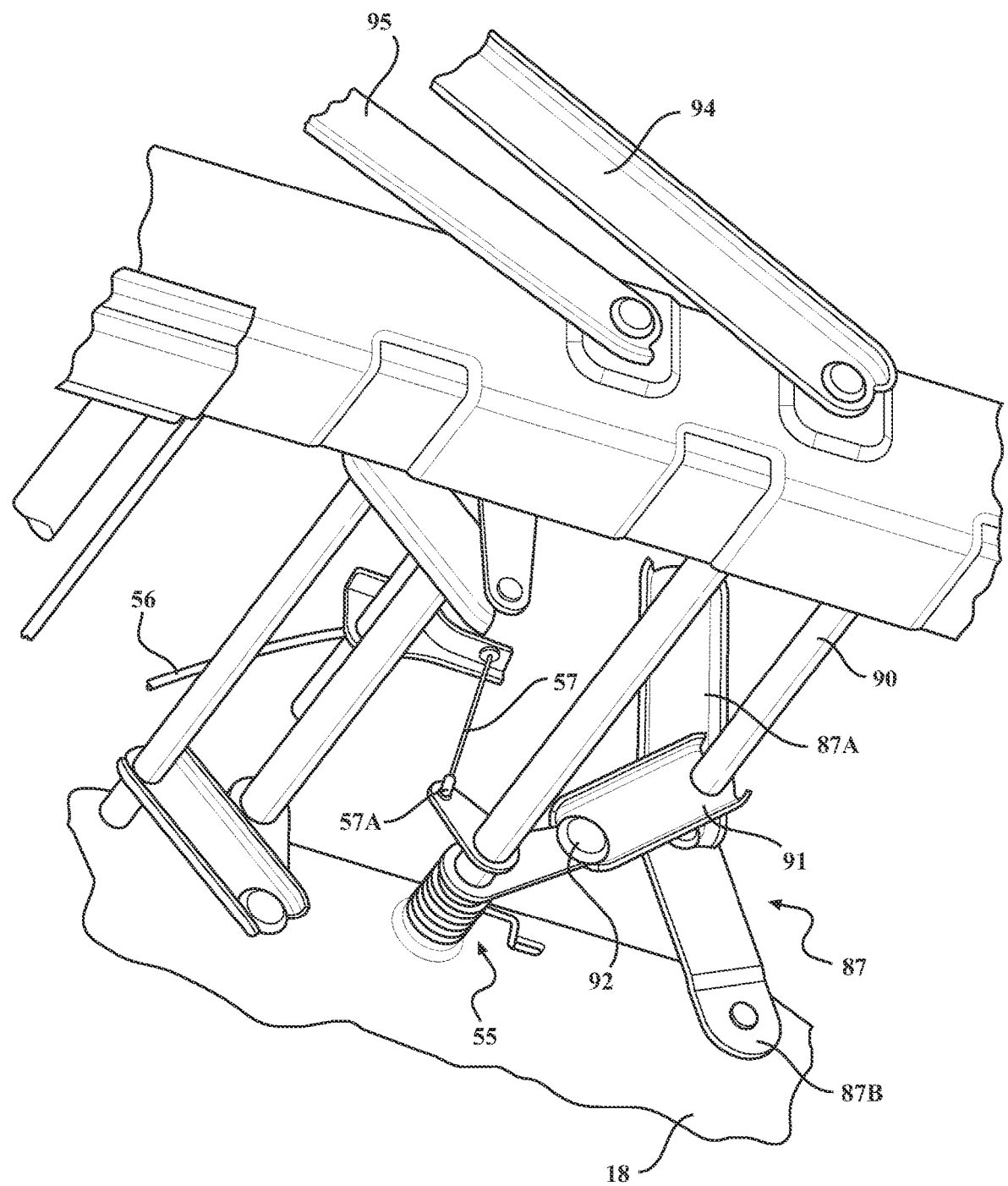
FIG. 9 is a fragmentary perspective view of the seat riser assembly and seat control linkages.

As seen in more detail in FIG. 9, the front linkage 87 comprises upper and lower pivot links 87A and 87B, which pivotally connect at one of their ends to the seat cushion frame 84 and seat riser assembly 18 and have adjacent free ends that pivotally join together by a cross tube 90. The cross tube 90 displaces and rotates during articulation of the individual pivot links 87A and 87B during seat movement. The cross tube 90 connects to the articulating mechanism 55 through a drive link 91 that is affixed to the cross tube 90. The drive link 91 terminates at a drive pivot 92 that in turn drives the articulating mechanism 55. As the seat cushion frame 84 moves forwardly and rearwardly, the relative angles of the pivot links 87A and 87B change. The movement of pivot links 87A and 87B swings or rotates the drive link 91 about the cross tube 90. As described below, this swinging movement of the drive link 91 will actuate the articulation cable 56. The control linkages 87 and 88 thereby control movement of the seat cushion frame 84, such that the seat cushion 12 is in either the first inclined position or the second inclined position depending on the position of the seat back 14, as will be further discussed. The control linkage 87 also drives the articulating mechanism 55 to articulate the head restraint 26.

Referring again to FIGS. 7 and 8, the seat cushion frame 84 is linked to the seat back frame 85 so that forward and rearward movement of the seat back frame 85 drives a corresponding movement of the seat cushion frame 84. This general movement is found in reversing seats and a detailed discussion thereof is not required. Generally, an additional control linkage is provided between the seat back frame 85 and the seat riser assembly 18, which comprises control links 94 and 95 that pivotally join the seat back frame 85 and seat riser assembly 18 on each side thereof in a four-bar linkage. These components are operatively linked to the seat cushion frame 84 to effect simultaneous synchronized movement between these linked components.

Figure 10:
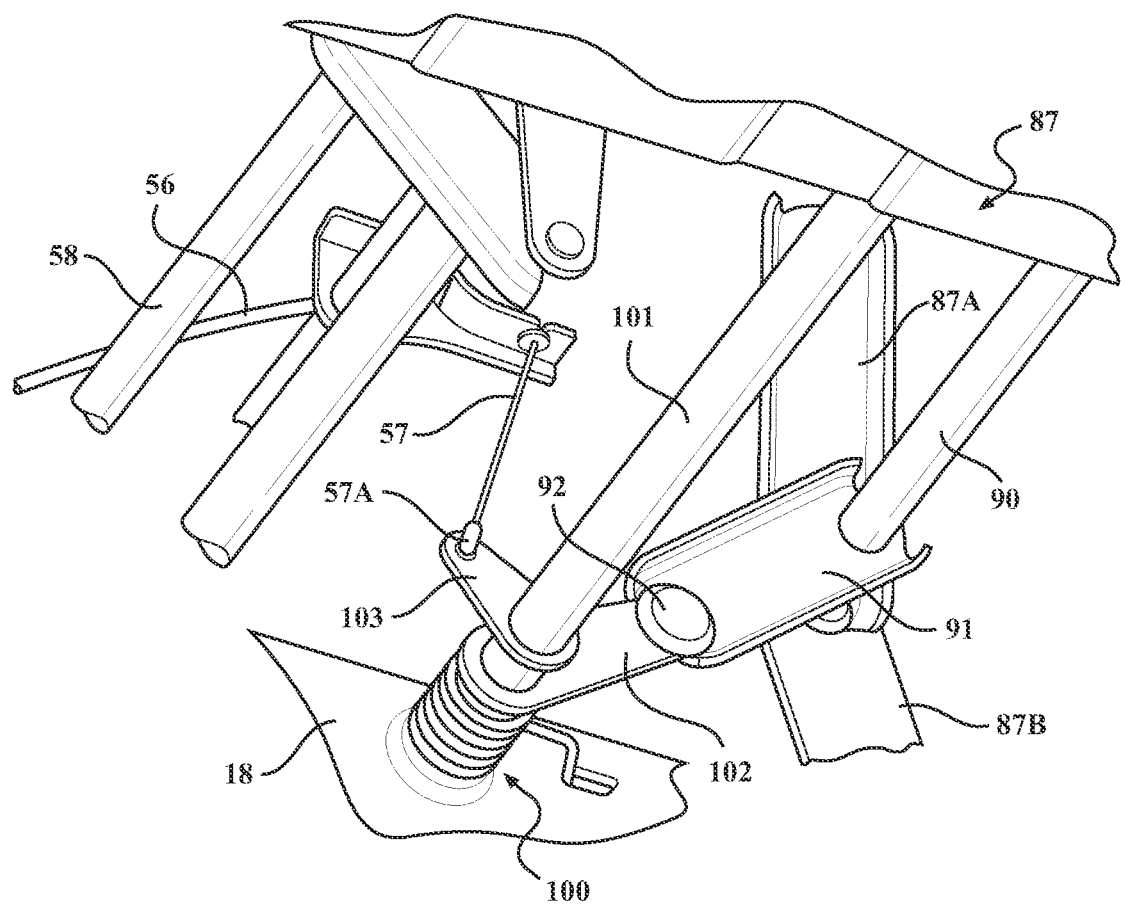
FIG. 10 is an enlarged partial view of an articulating mechanism drivingly connected to a seat control linkage.
Figure 12:
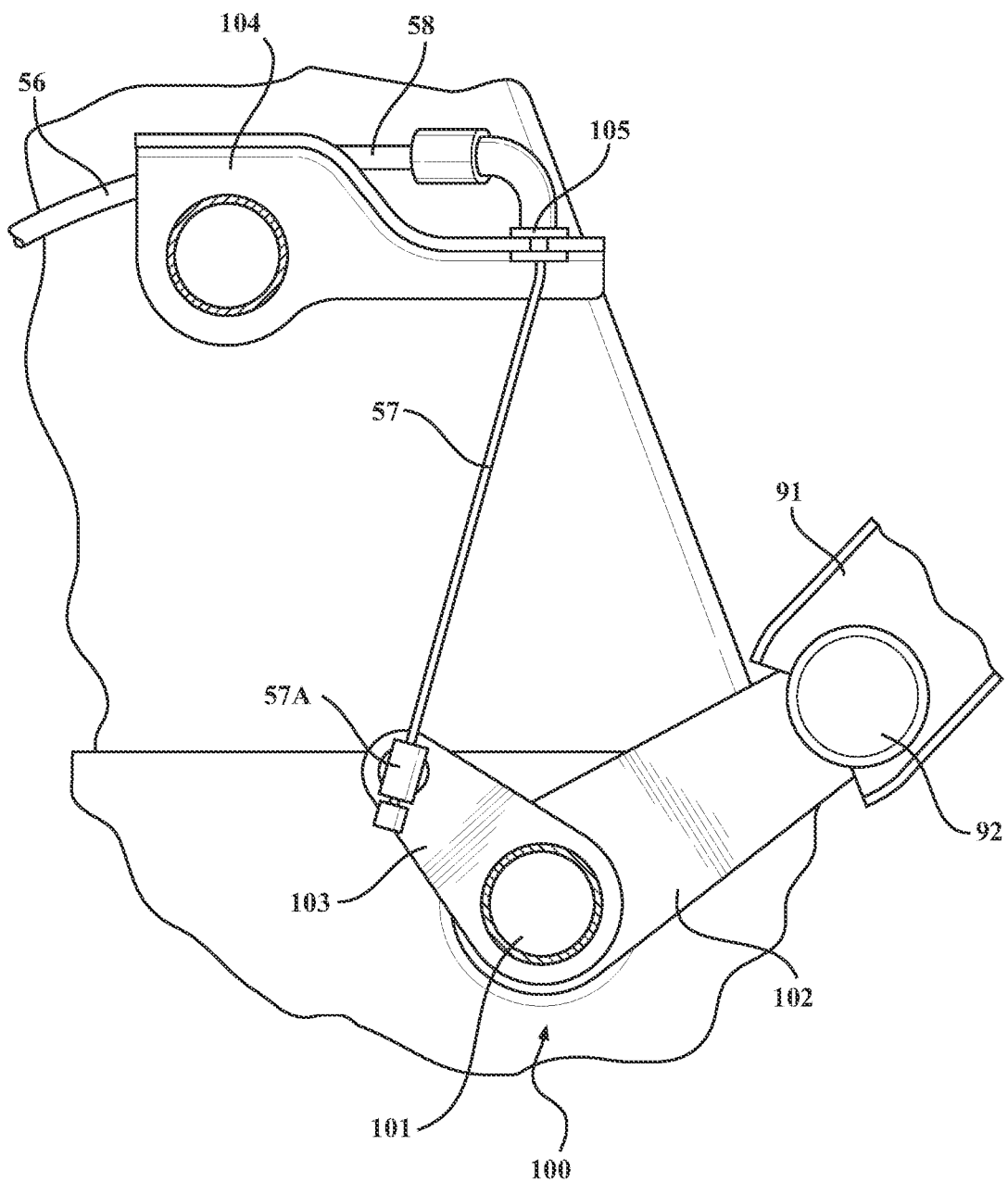
FIG. 12 is a partial side view showing the operative state of the articulating mechanism corresponding to FIG. 11.

Further, when the seat 10 is unlocked, the seat movement automatically articulates the head restraint 26 by the interconnection of the articulating mechanism 55 and at least one of the seat control linkages and preferably, the front control linkages 87. Referring to FIGS. 9, 10 and 12, the articulating mechanism 55 comprises the above-described control cable 56, and further comprises a drive linkage 100 that is supported on the seat riser assembly 18. The drive linkage 100 includes a cross tube 101 extending near and parallel to the front linkage cross tube 90. The cross tube 101 includes a radial driven arm 102 that connects to the front drive arm 91 at pivot joint 92. The driven arm 102 is rotated by the front drive arm 91 in response to motion of control linkage 87 to thereby rotate the cross tube 101. The cross tube 101 in turn includes a cable crank or actuator arm 103 that rotates therewith in response to seat movement and connects to the inner cable 57 of the articulation cable 56 to cause rotation of the head restraint 26.

To connect the cable 56 to the crank arm 103, the articulating mechanism 55 includes a cable mounting bracket 104 having a cable mount 105 that connects to the free end of the cable sheath 58. The above-described inner cable 57 projects downwardly and has a cable head 57A operatively connected to the cable crank 103. The cable crank 103 can reversibly rotate with the cross tube 101 depending upon whether the seat cushion 14 is moving rearwardly or forwardly which rotates the cross tube 101 in opposite directions.

As noted, the head restraint 26 includes the lock mechanism 51 to lock the head restraint 26 in either of the first and second use positions 26A and 26B depending upon the direction in which the seat faces. The lock mechanism 51 preferably connects to the release handle 31 of a seat lock mechanism 89 so that the release handle 31 can simultaneously unlock the seat 10 and unlock the head restraint 26. The seat lock mechanism 89 generally engages with the riser assembly 18 in either of the forward-facing or rearward facing positions and is actuated by the release handle 31.

To release the head restraint 26 from either of the first and second use positions 26A and 26B and allow the head restraint 26 to automatically articulate to the fold flat position 26C, the release handle or actuator 31 of a seat lock mechanism 89 is operatively connected to the lock mechanism 51 such that pulling on the release handle 31 releases both the seat lock mechanism 89 and the head restraint 26. Once released, the seat 10 is movable and the head restraint 26 preferably articulates automatically to the fold flat position 26C to avoid interference with the headliner 30 as the seat position is reversed. As the seat 10 moves, the articulating mechanism 55 articulates the angle of the head restraint 26 in response to displacement of the seat 10.

Figure 11:
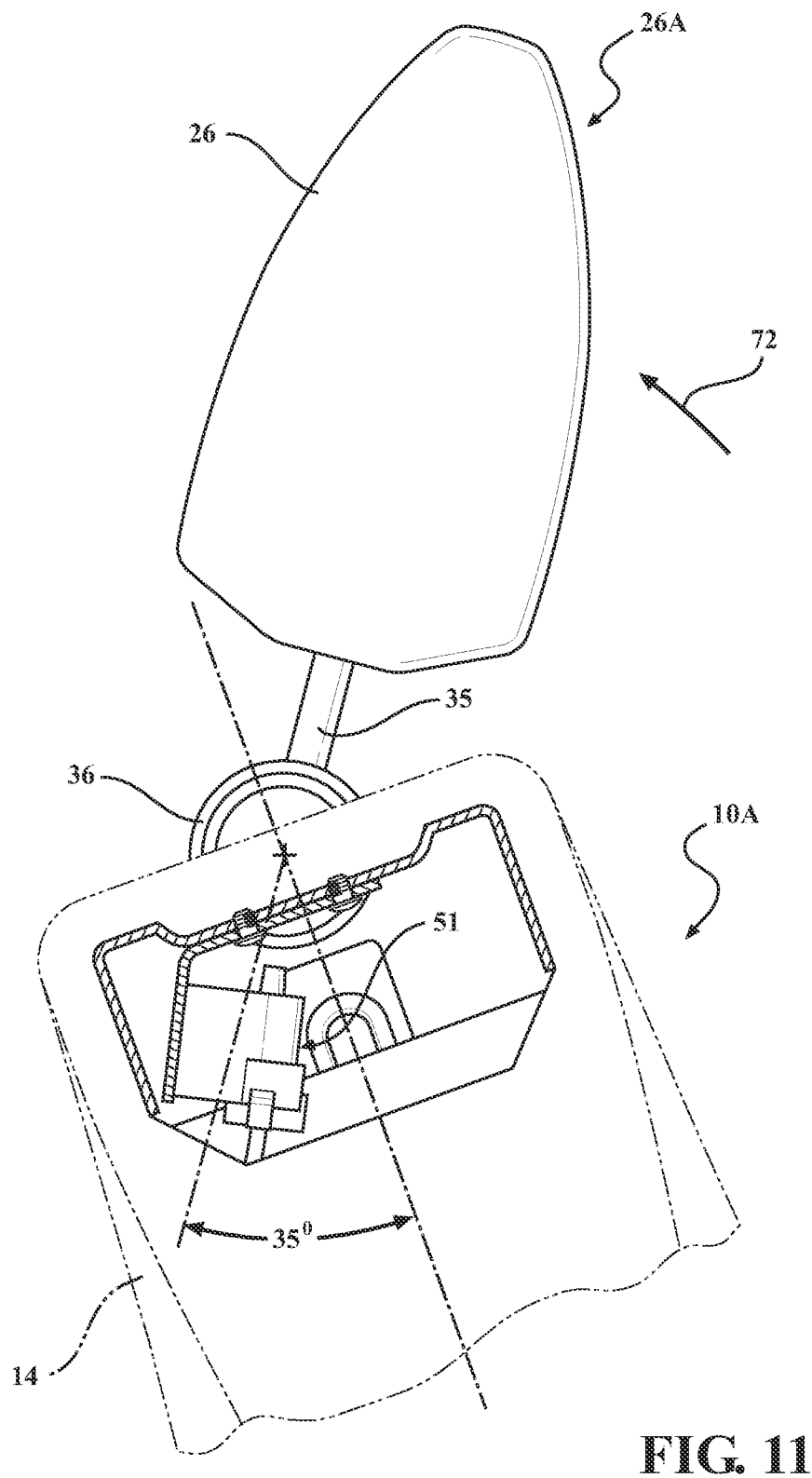
FIG. 11 is a side view of the seat back and head restraint in a forwardly-inclined use position.

For clarity, FIGS. 11-16 illustrate movement of the head restraint 26 and the operative articulation of this movement. In FIGS. 11 and 12, the head rest 26 is forwardly tilted in the first use position 26A with the locking pin 52 engaged. Preferably, the inclination angle of the center line of the head restraint 26 relative to the centerline of the seat back 14 is 35 degrees tilted forwardly. The locking pin 52 may be disengaged and the seat 10 and head restraint 26 unlocked by the release handle 31. In this position as seen in FIG. 12, the cable crank 103 is rotated to the rear and somewhat downward to maintain tension on inner cable 57.

Figure 13:
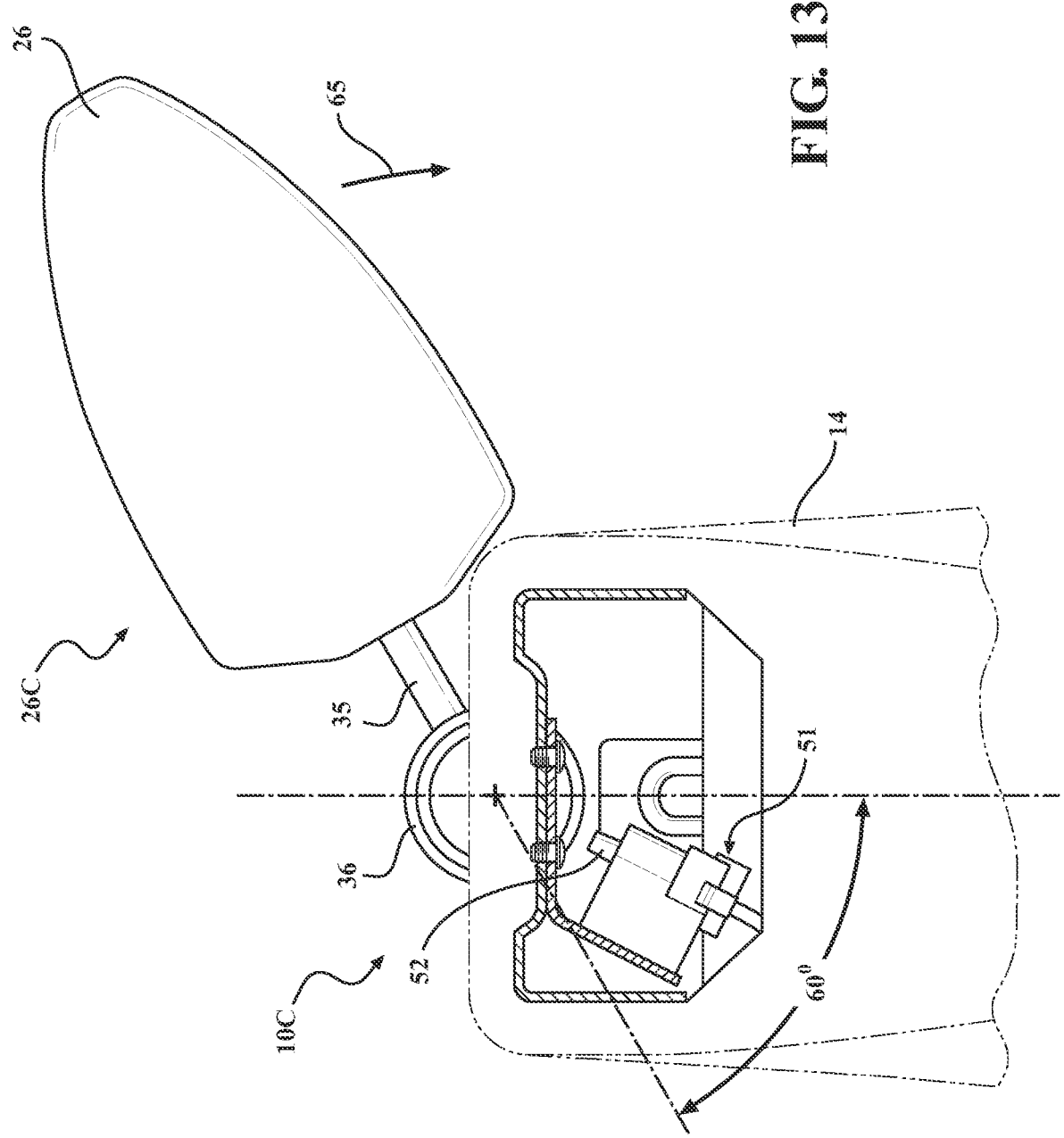
FIG. 13 is a side view of the head restraint in a fold flat position.
Figure 14:
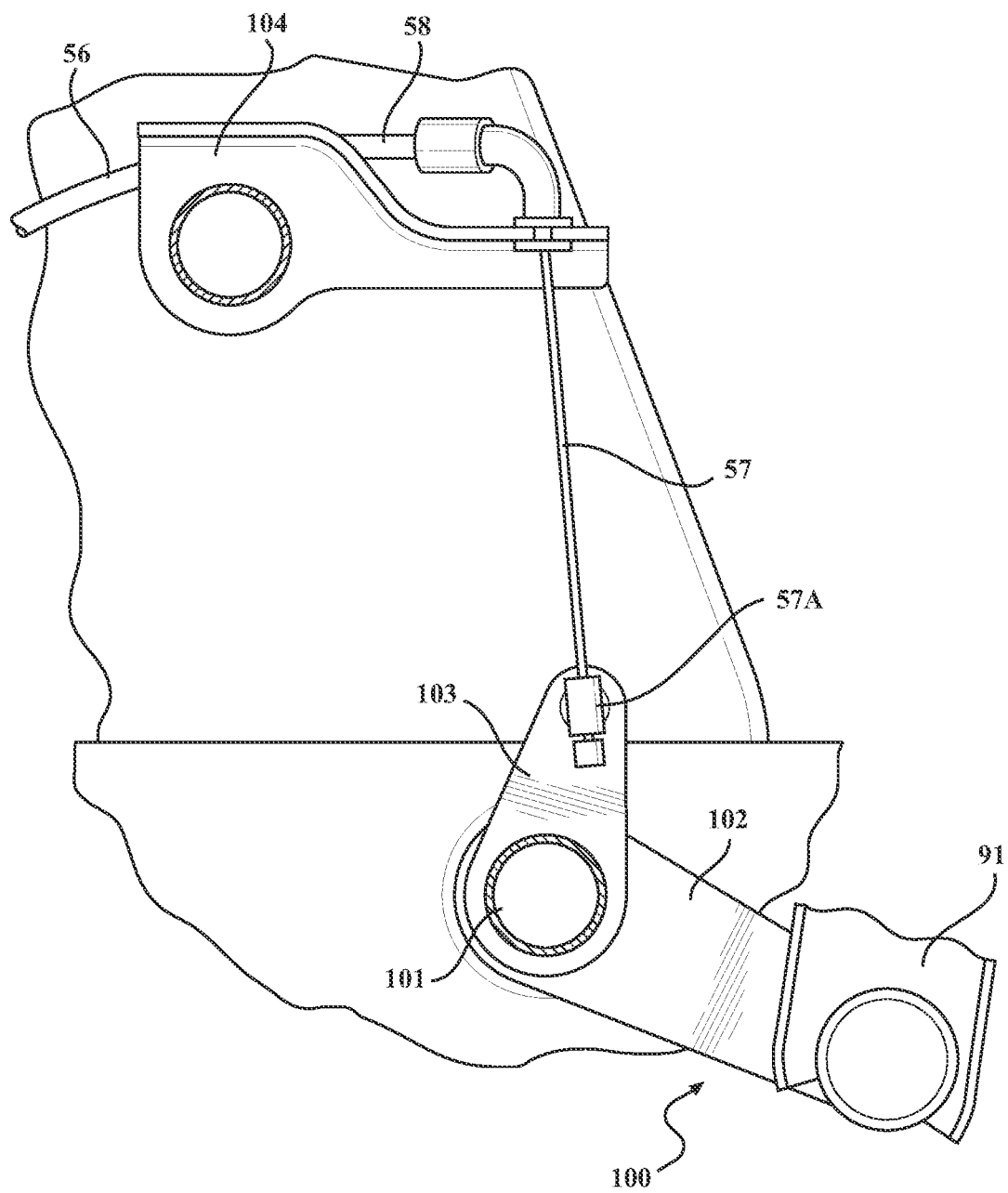
FIG. 14 is a partial side view showing the operative state of the articulating mechanism corresponding to FIG. 13.

Referring to FIGS. 13 and 14, when the locking pin 52 is retracted inwardly by the actuation of lock mechanism 51, the head restraint 26 is unlocked and pivots in direction 65 to the fold flat position 26C by the springs 64. Preferably, the inclination angle of the center line of the head restraint 26 relative to the centerline of the seat back 14 is 60 degrees to define a larger inclination angle in comparison to the inclination angle of the head restraint in the first and second use positions 26A and 26B of FIGS. 11 and 15. The locking pin 52 remains disengaged in this position since the seat back latch remains open. As the seat back 14 moves with the seat 10 to the neutral position 10C, the front control links 87 move forwardly and rotate which rotates the drive arm 91 downwardly so that it rotates the driven arm 102 downwardly as well. This rotation in turn rotates the cable crank 103 upwardly and forwardly over the top of the cross tube 101, which removes tension and creates slack in the inner cable 57 of the articulation cable 56. With this slack, the head restraint 26 is free to move to the fold flat position 26C when the seat 10 is in the neutral position 10C.

Figure 15:
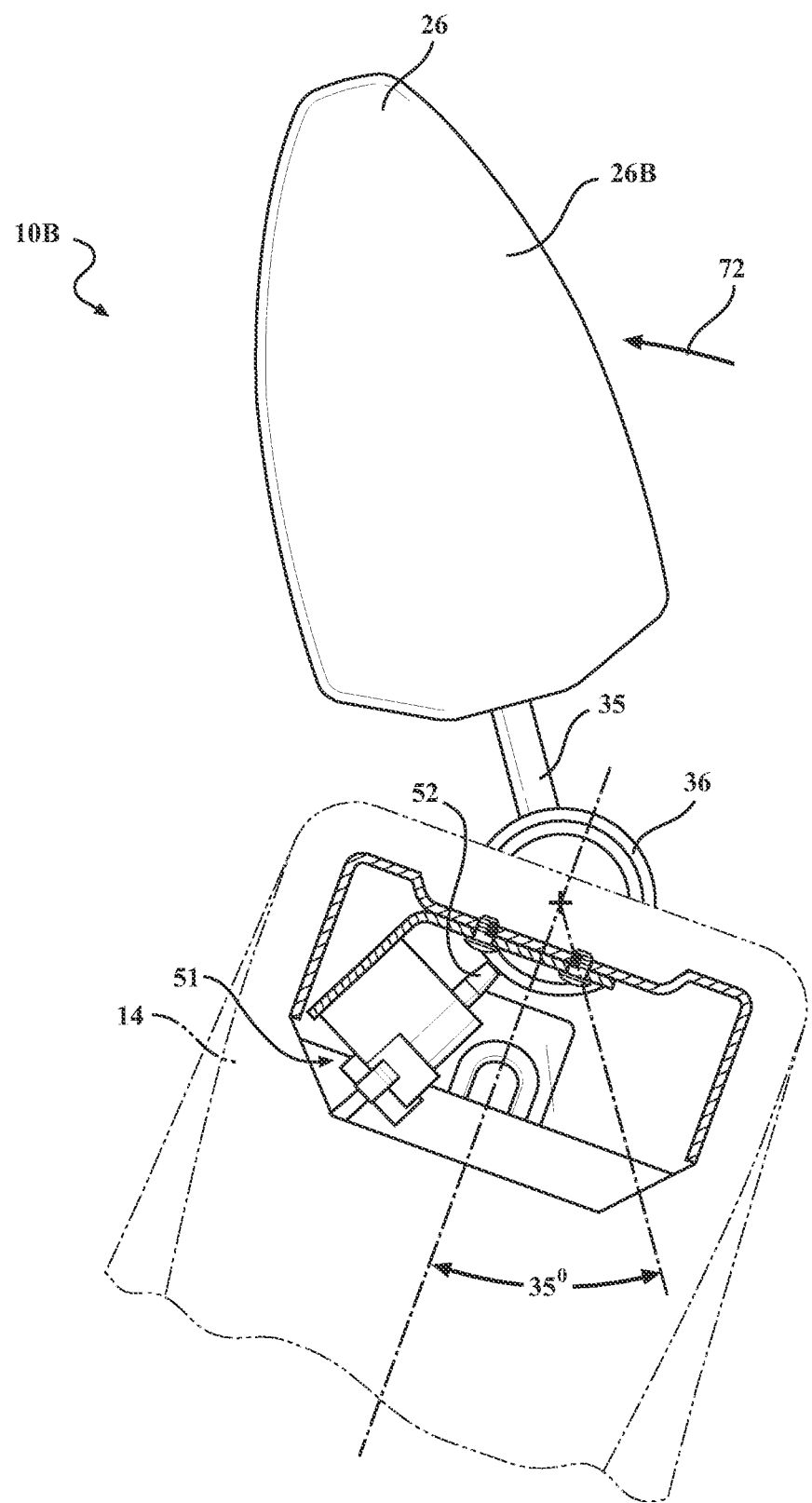
FIG. 15 is a side view of the seat back and head restraint in a rearwardly-inclined use position.
Figure 16:
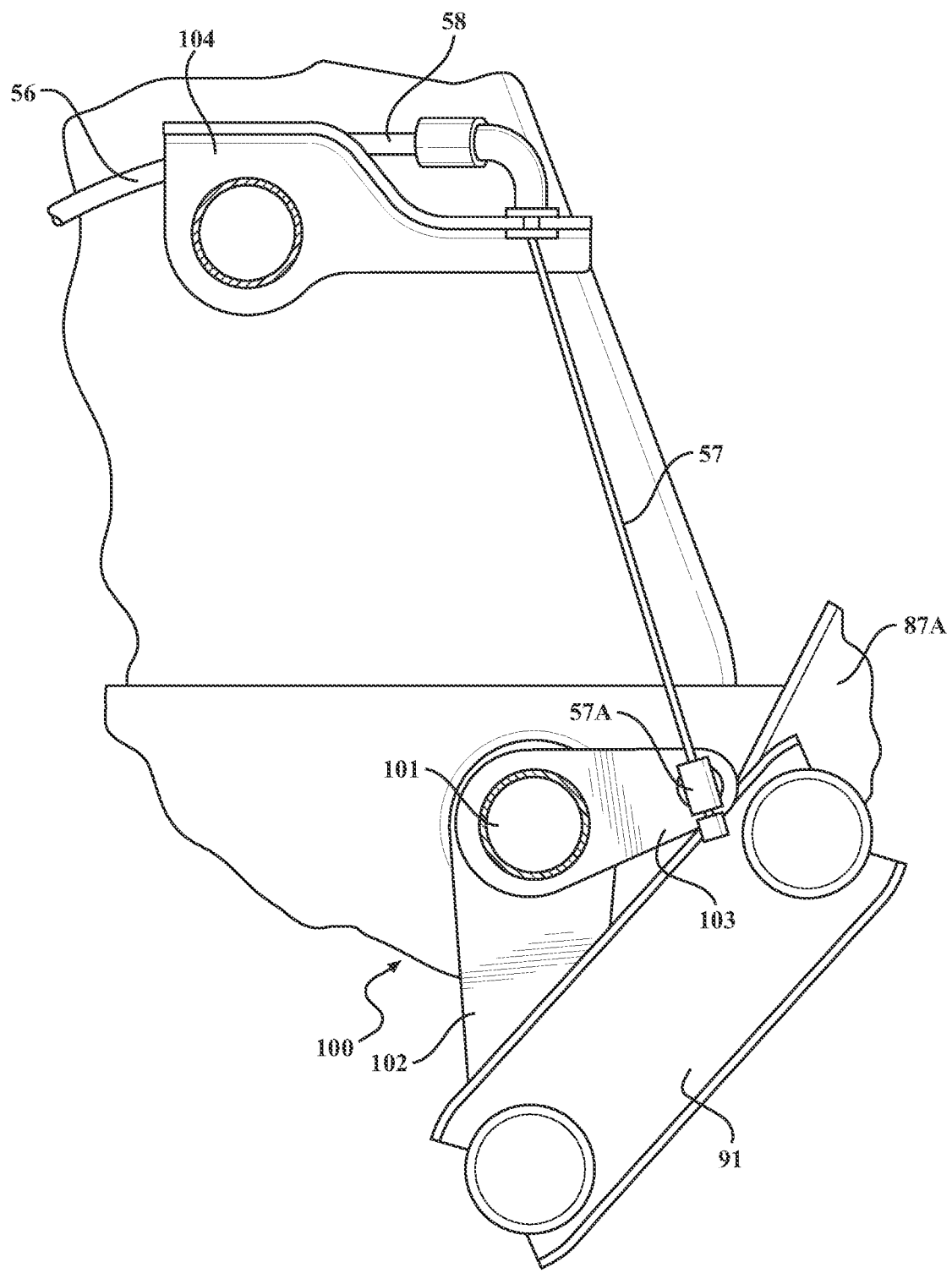
FIG. 16 is a partial side view showing the operative state of the articulating mechanism corresponding to FIG. 15.

Referring to FIGS. 15 and 16, the seat 10 ultimately moves to the rearward-facing position 10B. During this movement, the locking pin 52 remains released which avoids premature engagement of the locking pin with the first lock bore 69. As noted, the angle of the head rest 26 will articulate as the seat 10 moves. Preferably, the inclination angle of the center line of the head restraint 26 relative to the centerline of the seat back 14 is 35 degrees tilted rearwardly. When seat 10 reaches the rearward-facing position 10B, then the locking pin 52 will align with the second lock bore 70 and bias into lock bore 70 to lock the head rest 26 in the second use position 26B.

During this seat movement, the head restraint 26 pivots in direction 72. As the seat back 14 moves with the seat 10 to the rearward-facing position 10B, the front control links 87 continue to swing which continues to rotate the cable crank 103 forwardly past the upright center position of FIG. 14 so that the cable crank 103 extends forwardly and downwardly as shown in FIG. 16 and pulls on the inner cable 57. This tensioning of the cable 57 causes the corresponding articulation of the head restraint 26 until the locking pin 52 aligns with lock bore 70 and automatically engages therewith to relock the head restraint 26. When reversing seat movement, the cable crank 103 and other components described above merely reverse operation.

With this configuration, an improved head restraint 26 is provided which allows the head restraint 26 to avoid interference to the headliner 30, and automatically articulate between the first and second use positions 26A and 26B as the seat 10 is moved.

Although a particular preferred embodiment of the invention has been disclosed in detail for illustrative purposes, it will be recognized that variations or modifications of the disclosed apparatus, including the rearrangement of parts, lie within the scope of the present invention.

What is claimed:

1. A reversible seat assembly for use in an automotive vehicle comprising:
   a seat cushion displaceable in opposite forward and rearward directions;
   a seat back operatively coupled to said seat cushion so that said seat cushion and said seat back are displaceable together in said forward and rearward directions wherein said seat cushion and said seat back are reconfigurable in forward-facing and rearward facing positions, said seat assembly being lockable in said forward-facing and rearward facing positions and including an actuator for unlocking said seat assembly to permit said forward and rearward displacement thereof; and
   a head restraint pivotally mounted on said seat back so as to articulate between first and second use positions in response to displacement of said seat cushion, wherein said head restraint is forwardly or rearwardly inclined relative to said seat back in said forward-facing and rearward-facing positions, said head restraint being automatically pivotable to a fold flat position inclined greater than said first and second use positions when said seat back is displaced to an intermediate position located between said forward-facing and rearward-facing positions to reduce a height of said seat assembly.

2. The seat assembly according to claim 1, wherein said seat back includes a head restraint locking mechanism which is lockable to lock said head restraint in either of said first and second use positions.

3. The seat assembly according to claim 2, wherein said head restraint locking mechanism is actuated by said actuator upon unlocking of said seat assembly to unlock said head restraint and permit automatic pivoting of said head restraint to said fold flat position.

4. The seat assembly according to claim 3, wherein said head restraint includes a biasing mechanism which biases said head restraint to said fold flat position during displacement of said seat cushion and said seat back.

5. The seat assembly according to claim 4, wherein said seat assembly includes an articulating mechanism connected to said seat cushion to displace said head restraint from said fold flat position to either of said first and second use positions in response to displacement of said seat cushion.

6. The seat assembly according to claim 5, wherein said seat cushion is pivotally supported by at least one control linkage which moves with seat movement, and said articulating mechanism comprises an articulation cable connected between said control linkage and said head restraint to articulate said head restraint in response to movement of said control linkage.

7. The seat assembly according to claim 5, wherein said articulating mechanism permits said head restraint to articulate to said fold flat position as said seat back and said seat cushion pass through an intermediate position between said forward-facing and rearward-facing positions.

8. The seat assembly according to claim 7, wherein said articulation cable is tensioned by said control linkage as said seat assembly moves to said forward-facing position and said rearward facing positions to pull said head restraint to said respective first and second use positions, and said articulation cable is slack in said intermediate position to permit said automatic articulation of said head restraint to said fold flat position.

9. The seat assembly according to claim 8, wherein said biasing mechanism generates a biasing force that biases said head restraint to said fold flat position when said articulation cable is slack.

10. The seat assembly according to claim 9, wherein said biasing force is overcome by tensioning of said articulating cable by said control linkage to displace said head restraint to said first use position or said second use positions depending a direction of seat movement.

11. A reversible seat assembly for use in an automotive vehicle comprising:
 a seat riser assembly mountable to a vehicle floor;
 a seat cushion pivotally coupled to said seat riser assembly by at least one control linkage so that said seat cushion is displaceable in opposite forward and rearward directions for use by an occupant facing forwardly or rearwardly;
 a seat back operatively coupled to said seat riser assembly and displaceable in said forward and rearward directions to effect a corresponding displacement of said seat cushion wherein said seat cushion and said seat back are reconfigurable in forward-facing and rearward facing positions, said seat assembly being lockable in said forward-facing and rearward facing positions and including a release handle for unlocking said seat assembly to permit said forward and rearward displacement of said seat cushion and said seat back; and
 a head restraint pivotally mounted on said seat back so as to articulate between first and second use positions, wherein said head restraint is forwardly tilted or rearwardly tilted at respective inclined angles relative to a centerline of said seat back in said forward-facing and rearward-facing positions, said head restraint being automatically pivotable to a fold flat position tilted at a fold flat angle greater than said inclined angles when said seat back is displaced to an intermediate position between said forward-facing and rearward-facing positions to reduce a height of said seat assembly.

12. The seat assembly according to claim 11, wherein said seat back includes a head restraint locking mechanism which is lockable to lock said head restraint in either of said first and second use positions.

13. The seat assembly according to claim 12, wherein said head restraint locking mechanism is actuated by said release handle upon unlocking of said seat assembly to unlock said head restraint and permit automatic pivoting of said head restraint to said fold flat position.

14. The seat assembly according to claim 13, wherein said head restraint includes a biasing mechanism which biases said head restraint to said fold flat position during displacement of said seat cushion and said seat back.

15. The seat assembly according to claim 14, wherein said seat assembly includes an articulating mechanism connected to said control linkage to displace said head restraint from said fold flat position to either of said first and second use positions in response to displacement of said seat cushion.

16. The seat assembly according to claim 15, wherein said articulating mechanism comprises an articulation cable connected between said control linkage and said head restraint to articulate said head restraint.

17. The seat assembly according to claim 15, wherein said articulating mechanism permits automatic articulation of said head restraint to said fold flat position as said seat back and seat cushion pass through an intermediate position between said forward-facing and rearward-facing positions.

18. The seat assembly according to claim 17, wherein said articulating mechanism comprises an articulation cable connected between said control linkage and said head restraint to articulate said head restraint, said articulation cable being tensioned as said seat assembly moves to said forward-facing position and said rearward facing positions to pull said head restraint to said respective first and second use positions, and said articulation cable being slack in said intermediate position to permit said automatic articulation of said head restraint to said fold flat position.

19. The seat assembly according to claim 18, wherein said biasing mechanism generates a biasing force that biases said head restraint to said fold flat position when said articulation cable is slack, said biasing force being overcome by said articulating cable when tensioned to displace said head restraint to said first use position or said second use positions.

20. The seat assembly according to claim 19, wherein said seat back includes a head restraint locking mechanism which is lockable to lock said head restraint in either of said first and second use positions, said head restraint locking mechanism being actuated by said release handle upon unlocking of said seat assembly to unlock said head restraint and permit automatic pivoting of said head restraint to said fold flat position.

* * * * *